United States Patent
Leclercq et al.

(10) Patent No.: US 7,374,821 B2
(45) Date of Patent: May 20, 2008

(54) THERMAL BARRIER COMPOSITION AND A CERAMIC COATING HAVING SUCH A COMPOSITION

(75) Inventors: Bérangère Leclercq, Villejuif (FR); Rémy Mevrel, Le Plessis Robinson (FR); Alban Azzopardi, Paris (FR); André Malie, Chatellerault (FR); Bertrand Saint-Ramond, Fontainebleau (FR)

(73) Assignees: Snecma, Paris (FR); Snecma Services, Paris (FR)

( * ) Notice: Subject to any disclaimer, the term of this patent is extended or adjusted under 35 U.S.C. 154(b) by 202 days.

(21) Appl. No.: 10/911,598

(22) Filed: Aug. 5, 2004

(65) Prior Publication Data

US 2005/0064225 A1    Mar. 24, 2005

(30) Foreign Application Priority Data

Aug. 7, 2003    (FR) .................................. 03 09743

(51) Int. Cl.
*B32B 9/00* (2006.01)

(52) U.S. Cl. .................. 428/469; 428/472; 428/701; 428/702; 501/103

(58) Field of Classification Search .............. None
See application file for complete search history.

(56) References Cited

U.S. PATENT DOCUMENTS

| | | | |
|---|---|---|---|
| 5,302,465 A | 4/1994 | Miller et al. | |
| 6,808,761 B2 * | 10/2004 | Chaput et al. | 427/596 |
| 7,060,365 B2 * | 6/2006 | Bruce | 428/632 |
| 2004/0197580 A1 * | 10/2004 | Dorfman et al. | 428/472 |

FOREIGN PATENT DOCUMENTS

EP    1 321 541    6/2003

OTHER PUBLICATIONS

S. Raghavan, et al., "Thermal Properties of Zirconia Co-Doped with Trivalent and Pentavalent Oxides", Acta mater, vol. 49, No. 1, XP-02275560, Jan. 8, 2001, pp. 169-179.

Dae-Joon Kim, et al., "Phase Stability and Physical Properties of Cubic and Tetragonal $ZrO_2$ in the System $ZrO_2$-$Y_2O_3$-$Ta_2O_5$", Journal of the American Ceramic Society, vol. 74, No. 12, XP-002275561, Dec. 1991, pp. 3061-3065.

(Continued)

*Primary Examiner*—Jennifer McNeil
*Assistant Examiner*—Timothy M Speer
(74) *Attorney, Agent, or Firm*—Oblon, Spivak, McClelland, Maier & Neustadt, P.C.

(57) ABSTRACT

The invention relates to a ceramic thermal barrier composition of low conductivity and high high-temperature strength. In characteristic manner, the composition comprises a zirconia base, at least one trivalent oxide enabling the zirconia to be stabilized and enabling the thermal conductivity of the zirconia to be reduced in optimum manner, and at least one pentavalent oxide enabling the content of oxygen vacancies to be reduced so as to make it substantially equal to that of a partially stabilized zirconia. Preferably, said trivalent oxide is present with a molar content constituted by a first portion enabling the zirconia to be stabilized partially and a second portion which introduces point defects into the lattice said pentavalent oxide is present with a molar concentration equal to said molar concentration of said second portion of the trivalent oxide. The invention is applicable to making a superalloy machine part having a ceramic coating with said composition, and possibly also a bonding underlayer.

16 Claims, 1 Drawing Sheet

OTHER PUBLICATIONS

Bérangére Leclercq, et al., "Thermal Conductivity of Zirconia-Based Ceramics for Thermal Barrier Coatings", CIMTEC 2002-10th International Ceramics Congress and 3rd Forum on New Materials 10th International Ceramics Congress-Part C, Advances in Science and Technology, XP-008029240, 2003, pp. 365-372.
Patent Abstracts of Japan, JP 2001-348655, Dec. 18, 2001.

* cited by examiner

THERMAL BARRIER COMPOSITION AND A CERAMIC COATING HAVING SUCH A COMPOSITION

The invention relates to a thermal barrier composition having low thermal conductivity, to a machine part made of superalloy and protected by a ceramic coating having such a composition, to said ceramic coating, and to a method of fabricating the ceramic coating.

BACKGROUND OF THE INVENTION

Efforts to increase the efficiency of turbomachines, in particular in the field of aviation, and to reduce fuel consumption and emissions of polluting gases and unburned fuel have led to a move towards stoichiometric mixtures for fuel combustion. This situation is accompanied by an increase in the temperature of the gas leaving the combustion chamber and going towards the turbine.

Consequently, it has been necessary to adapt the materials of the turbine to such an increase in temperature, by improving techniques for cooling turbine blades (hollow blades) and/or by improving the properties of such materials to enable them to withstand high temperatures.

This second technique, in combination with the use of superalloys based on nickel and/or cobalt, has led to various solutions, including depositing a thermally insulating coating referred to as a "thermal barrier".

On a part that is being cooled, and during operating under steady conditions, the ceramic coating enables a temperature gradient to be set up through the coating over a total amplitude that may exceed 200° C. for a coating that is about 150 micrometers (μm) thick. The operating temperature of the underlying metal constituting the substrate for the coating is thus decreased by the same amount, thereby leading to significant savings in the volumes of cooling air that are needed, to improvements in the lifetime of the part, and savings in the specific fuel consumption of the turbine engine.

Usually, the ceramic coatings are deposited on the part for coating either by a spraying technique (in particular plasma spraying), or by a physical vapor deposition technique, i.e. by evaporation (in particular by electron beam physical vapor deposition (EB-PVD) forming a coating that is deposited in an evacuated evaporation enclosure under electron bombardment).

For a sprayed coating, a zirconium-based oxide is deposited by plasma spraying type techniques, thereby leading to the formation of a coating constituted by a stack of droplets that were molten and then quenched by impact, being flattened and stacked so as to form a deposit that is densified imperfectly and that has a thickness generally lying in the range 50 μm to 1 millimeter (mm).

A coating obtained by physical deposition, in particular by evaporation under electron bombardment, leads to a coating constituted by an arrangement of columns directed substantially perpendicularly to the coated surface, over a thickness lying in the range 20 μm to 600 μm. Advantageously, the space between the columns enables the coating to compensate effectively for thermomechanical stresses due, at operating temperatures, to differential expansion relative to the superalloy substrate. Parts are thus obtained having lifetimes that are long in terms of high-temperature thermal fatigue.

Conventionally, such thermal barriers thus create a thermal conductivity discontinuity between the outer coating on the machine part, including said thermal barrier, and the substrate of said coating forming the material constituting the part.

Usually, it is found that thermal barriers which give rise to a significant discontinuity in thermal conductivity run the risk of significant delamination between the coating and the substrate, or more precisely at the interface between the underlayer and the ceramic thermal barrier.

At present, it is desired to obtain thermal barrier compositions which provide machine parts with the ability to withstand surface temperatures up to about 1500° C., i.e. up to about 1300° C. in the substrate. The thermal barriers presently in use enable machine parts to withstand surface temperatures up to about 1200° C.-1300° C., i.e. 1000° C.-1100° C. in the substrate.

It is known to make use of a thermal barrier obtained from a base material constituted by zirconia which presents a coefficient of expansion close to that of the superalloy constituting the substrate, and that is of thermal conductivity that is quite low.

French patent application FR 2 798 864 proposes making use of dysprosium oxide in the zirconia. That solution enables the thermal conductivity of the thermal barrier to be reduced.

OBJECTS AND SUMMARY OF THE INVENTION

An object of the present invention is to provide a novel thermal barrier composition based on zirconia that makes it possible to obtain a thermal barrier coating having lower thermal conductivity than that of the yttrium-containing zirconia usually used for thermal barriers (or lower than that of the composition of FR 2 798 864), while increasing the high-temperature strength and thermal stability properties of said yttrium-containing zirconia (or of the composition of FR 2 798 864).

An object of the present invention is thus to provide a novel zirconia-based thermal barrier composition making it possible to obtain a thermal barrier composition having low thermal conductivity without affecting high-temperature strength for operating temperatures lying in the range 1100° C. to 1500° C.

The idea on which the present invention is based is to consider that there is a relationship between a reduction in the qualities, in particular in terms of high-temperature strength, of the coating obtained from the thermal barrier and an increase in the number of oxygen vacancies in the crystal lattice of the ceramic.

Consequently, it is proposed to maintain a high concentration of point defects in the thermal barrier composition, while nevertheless limiting the number of vacancies to a value that makes it possible to stabilize the zirconia, at least in part.

The number of oxygen vacancies is fundamental for stabilizing zirconia in its tetragonal allotropic variety t'. In particular, a concentration of about 24% by weight (12% molar) of yttrium oxide $Y_2O_3$ is required for completely stabilizing the zirconium oxide $ZrO_2$, whereas a concentration of 6% to 8% by weight (3% to 4% molar) of yttrium oxide $Y_2O_3$ is needed to stabilize zirconium oxide $ZrO_2$ partially to a level that corresponds to its greatest high-temperature strength (the lifetime of the coating is measured by subjecting it to cycles of rising and falling temperature, where such a test is referred to as thermal cycling).

This can be seen from FIG. 2 which shows, as a function of the content of yttrium oxide in the zirconia (expressed as a % by weight), an upper right curve relating to thermal conductivity λ, and a lower curve relating to the mechanical strength of the thermal barriers (where N represents the maximum number of cycles for which the coating made from the thermal barrier presents acceptable mechanical qualities at the end of thermal cycling).

When the zirconia $ZrO_2$ is fully stabilized (24% by weight or 12% molar yttrium oxide $Y_2O_3$), the number of oxygen vacancies is at a maximum and minimum thermal conductivity $\lambda_{min}$ is obtained, but the ceramic deposited by plasma spraying or by evaporation also presents a drop in its high-temperature strength against stresses ($N_0$ less than $N_{max}$ in FIG. 2).

When the zirconia $ZrO_2$ is partially stabilized (between 6% and 8% by weight or 3% to 4% molar yttrium oxide $Y_2O_3$), it is found that the ceramic presents high-temperature strength against stresses that is at a maximum ($N_{max}$ in FIG. 2), but that there is a significant increase in thermal conductivity ($\lambda_1$ greater than $\lambda_{min}$ in FIG. 2) because of the smaller number of oxygen vacancies, or more generally because of the smaller number of defects in the crystal lattice.

The use of stabilizers other than yttrium oxide leads to the same observations.

The very good ability of partially stabilized zirconia to withstand thermal cycling is attributed to its metastable tetragonal structure t' which transforms under typical operating conditions into a very fine two-phase structure [S. Alpérine, L. Lelait, "Microstructural investigations of plasma-sprayed yttria partially stabilized zirconia TBC in relation with thermomechanical resistance and high temperature oxidation mechanisms", Proc. 37th ASME International Gas Turbine and Aeroengine Congress, Köln, ASME 92-GT-317 (1992)].

This t' structure is directly associated with the oxygen vacancy content in the zirconia lattice, and that is why it is thought that $ZrO_2$+6% to 8% by weight (3% to 4% molar) of $Y_2O_3$ gives rise to a metastable t' crystal structure due to the corresponding number of oxygen vacancies in the lattice.

Concerning means for reducing the thermal conductivity $\lambda_{real}$ of the coating, it is thought that it lies at a value in the range $\lambda_{intr}$ of the dense ceramic material and $\lambda_{air}$ of air, since thermal barrier coatings are porous ceramic layers forming a heterogeneous assembly of two heat-conducting media (the ceramic medium and the pores or microcracks in the coating which are filled with air in operation).

A first solution for obtaining a coating of low thermal conductivity consists in using a ceramic of conventional ceramic composition, and in modifying the morphology of the coating, i.e. the proportion, the distribution, and the orientation of the pores and microcracks in the coating, or else the arrangement of the material in the form of columns or layers, so as to decrease $\lambda_{real}$. It is possible to achieve this result by modifying the coating deposition parameters.

A second solution consists in seeking to decrease $\lambda_{intr}$ directly by modifying the chemical composition of the coating, without altering its morphology, while conserving the other properties of the coating. For example, it is well known that introducing yttria in the zirconia lowers thermal conductivity by deforming the lattice (atomic radius Y>atomic radius Zr) and by introducing oxygen vacancies in the lattice because of the different valancies of ions of zirconium and of yttrium. In general, introducing point defects in the lattice, which act as centers for phonon backscattering, contributes to reducing thermal conductivity.

This is the technique that is implemented in the present invention.

In order to achieve the above-mentioned objects, the present invention provides a thermal barrier composition of low thermal conductivity and of high high-temperature strength, made of ceramic, the composition comprising a zirconia base, at least one trivalent oxide (or a mixture of trivalent oxides) enabling the zirconia to be stabilized, and enabling the thermal conductivity of the zirconia to be reduced in optimum manner, and at least one pentavalent oxide (or a mixture of pentavalent oxides) enabling the content of oxygen vacancies to be reduced so as to make it substantially equal to that of the partially stabilized zirconia.

Introducing the trivalent oxide is associated with incorporating oxygen vacancies that enable the zirconia to be stabilized. More precisely, for two introduced trivalent cations, one oxygen vacancy is necessarily introduced in order to preserve the electrical neutrality of the zirconia. Nevertheless, in order to avoid incorporating too many vacancies, which can become ordered and lead to an increase in thermal conductivity, and in order to be able to adjust the stabilization of the zirconia, the concentration of oxygen vacancies is controlled by introducing pentavalent oxides. The introduction of two pentavalent cations is accompanied by the disappearance of an oxygen vacancy, likewise in order to preserve the electrical neutrality of the zirconia.

In this way, it will be understood that it is possible to introduce a large number of point defects (the trivalent and pentavalent oxide cations which substitute for ions of $Zr^{4+}$), which is favorable to decreasing thermal conductivity, while adjusting the concentration of oxygen vacancies in order to maintain it at a value that corresponds to the desired degree of stabilization for the zirconia (partially stabilized zirconia).

Preferably, provision is thus made for said trivalent oxide to be present at a molar concentration constituted by a first portion enabling the zirconia to be partially stabilized and a second portion which introduces point defects into the lattice, and provision is made for said pentavalent oxide to be present with a molar concentration equal to said molar concentration of said second portion of the trivalent oxide.

Thus, by means of this preferred disposition, a thermal barrier composition is made available which makes it possible both to obtain a good lifetime (oxygen vacancy concentration corresponding to the metastable t' structure of zirconia which provides good high-temperature strength; $N_{max}$ in FIG. 2), and minimum thermal conductivity (close to $\lambda_{min}$ in FIG. 2, see arrow 10) due to the presence of numerous point defects.

The present invention also provides a machine part made of superalloy, including a ceramic coating having a composition of the above-specified type.

Advantageously, the machine part further includes a bonding underlayer on which said ceramic coating is deposited.

The present invention also provides a ceramic coating comprising a bonding underlayer, a first layer of ceramic based on yttrium-containing zirconia having a molar concentration of yttrium oxide in the range 4% to 12%, and a second layer of ceramic presenting a composition of the above-specified type, said first ceramic layer being situated between said bonding underlayer and said second ceramic layer.

In this way, a thermal barrier coating is obtained that provides a first thermal gradient through the first ceramic layer and a second thermal gradient through the second ceramic layer presenting a composition of the invention.

The present invention also provides a method of fabricating a ceramic coating comprising a thermal barrier on a superalloy substrate, wherein the method comprises the following steps:

depositing a bonding underlayer on said superalloy substrate; and depositing a ceramic coating on said underlayer, the ceramic coating comprising a zirconia base, at least one trivalent oxide (or a mixture of trivalent oxides) enabling the zirconia to be stabilized and enabling the thermal conductivity of the zirconia to be reduced in optimum manner, and at least one pentavalent oxide (or a mixture of pentavalent oxides) enabling the content of oxygen vacancies to be reduced as to make substantially equal to that of a partially stabilized zirconia.

BRIEF DESCRIPTION OF THE DRAWINGS

Other advantages and characteristics of the invention will appear on reading the following description made by way of example and with reference to the accompanying drawing, in which.

MORE DETAILED DESCRIPTION

Figure 1:
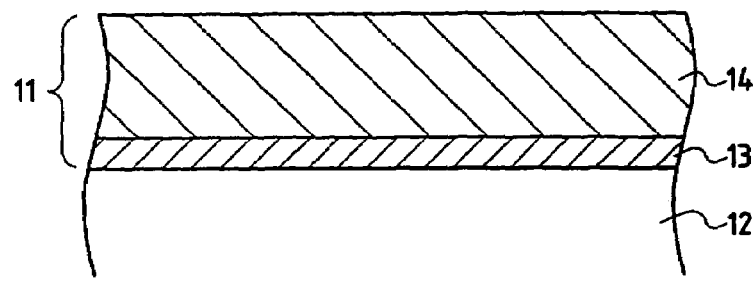
FIG. 1 is a diagrammatic section view showing a portion of a machine part coated in a thermal barrier of the invention.
Figure 2:
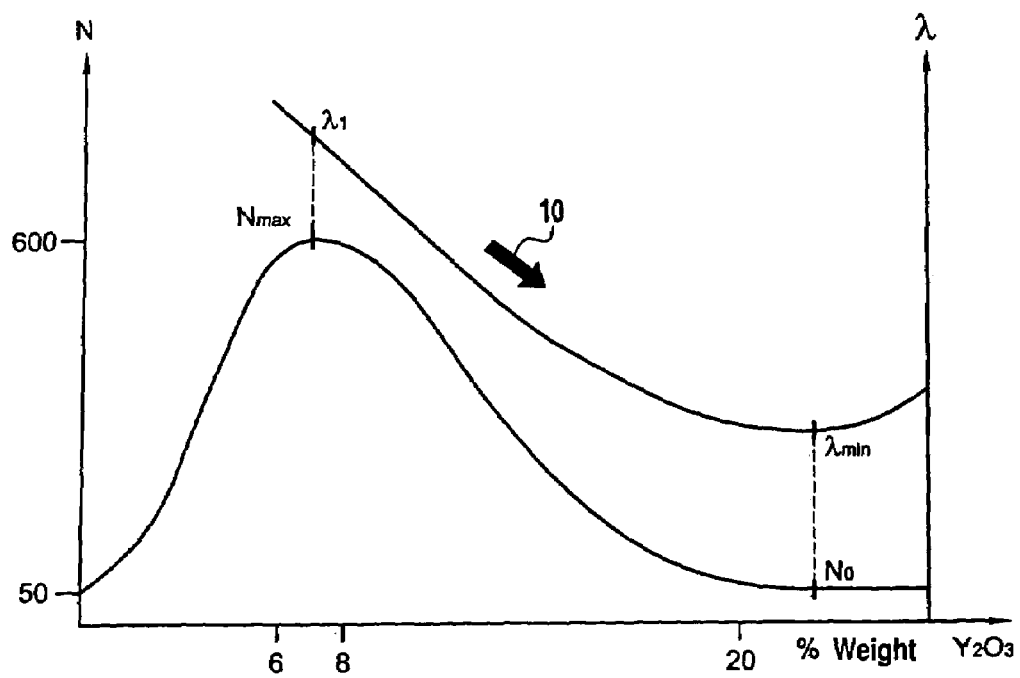
FIG. 2, described above, is a graph with curves relating to thermal conductivity and to the mechanical strength of thermal barriers as a function of the yttrium oxide content in the zirconium.

The machine part shown in FIG. 1 comprises a thermal barrier coating 11 deposited on a substrate 12 of superalloy, such as superalloy based on nickel and/or cobalt. The thermal barrier coating 11 comprises a metal underlayer 13 deposited on the substrate 12, and a ceramic layer 14 of composition in accordance with the invention, deposited on the underlayer 13.

The underlayer 13 may be an alumina-forming alloy that withstand oxygen corrosion, such as an alloy suitable for forming a protective layer of alumina by oxidation, an alloy of the MCrAlY type (M being a metal selected from nickel, cobalt, iron, or a mixture of said metals), or a nickel or cobalt aluminide optionally modified by adding a metal selected from platinum, chromium, palladium, ruthenium, iridium, osmium, rhodium, or a mixture of these metals and/or a reactive element selected from zirconium (Zr), hafnium (Hf), and yttrium (Y).

The ceramic layer 14 is constituted by a zirconia base, a trivalent oxide, and a pentavalent oxide.

By stabilizing the zirconia, the trivalent oxide makes it possible to improve its high-temperature strength: priority is given to maximizing high-temperature strength, i.e. a zirconia that is partially stabilized, thus a trivalent oxide $R_2O_3$ present with a total content greater than a value lying in the range 4% to 8% by weight (2% to 4% molar) (in which a distinction is drawn between a first portion equal to a value lying in the range 4% to 8% by weight or in the range 2% to 4% molar, and a second portion).

To this basic composition (partially stabilized zirconia containing the first portion of trivalent oxide, i.e. 2% to 4% molar trivalent oxide), there is added an equivalent number of moles of trivalent oxide and of moles of pentavalent oxide. This addition serves to introduce a large number of point defects, so as to cause thermal conductivity to drop without spoiling high-temperature strength since the oxygen vacancy content remains constant.

Said trivalent oxide is selected from the group comprising: yttrium oxide, scandium oxide, dysprosium oxide, ytterbium oxide, erbium oxide, gadolinium oxide, europium oxide, samarium oxide, neodymium oxide, praseodymium oxide, lanthanum oxide, terbium oxide, holmium oxide, and mixtures thereof, with a preference for yttrium oxide.

Said pentavalent oxide is selected from the group comprising niobium oxide, tantalum oxide, and mixtures thereof.

Advantageously, said trivalent oxide is present in a molar concentration lying in the range 4% to 30% and said pentavalent oxide is present in a molar concentration lying in the range 2% to 30%, preferably in the range 4% to 12%, and more preferably in the range 3% to 10%.

In a preferred embodiment of the thermal barrier composition of the invention, the difference between the molar concentration of trivalent oxide and the molar concentration of pentavalent oxide lies in the range 4% to 12%, and is preferably substantially equal to 4%.

These conditions correspond to applying the principle whereby said trivalent oxide is present with a molar concentration made up of a first portion serving to stabilize the zirconia partially, and a second portion which introduces point defects in the lattice, and whereby said pentavalent oxide is present with a molar concentration that is equal to said molar concentration of said second portion of the trivalent oxide.

Under such circumstances, said first portion of the molar concentration of trivalent oxide lies in the range 4% to 12%, and is preferably substantially equal to 4%, i.e. to the content that enables partially stabilized zirconia to be obtained.

Similarly, said second portion of the molar concentration of trivalent oxide exceeds the molar concentration of said first portion by a quantity which is substantially equal to the molar concentration of the pentavalent oxide.

The superalloy machine part shown in FIG. 1 may be modified (not shown in the figure) by the ceramic coating 11 further comprising, on said underlayer 13, a ceramic layer based on yttrium containing zirconia, with a molar content of yttrium oxide lying in the range 4% to 12%.

In this way, the coating is formed by adding onto a first layer of yttrium-containing zirconia ceramic that is used in conventional manner (partially stabilized zirconia), a second layer of ceramic made using the composition of the invention.

The invention also provides a method of fabricating a ceramic coating comprising a thermal barrier on a superalloy substrate, the method comprising the following steps:

depositing a bonding underlayer on said superalloy substrate; and depositing a ceramic coating on said underlayer, the coating comprising a zirconia base, at least one trivalent oxide (or a mixture of trivalent oxides) serving to stabilize, preferably to stabilize partially, the zirconia, and to reduce the thermal conductivity of the zirconia in optimum manner, and at least one pentavalent oxide (or a mixture of pentavalent oxides) serving to decrease the content of oxygen vacancies in order to bring it substantially to that of the partially stabilized zirconia.

For this purpose, and advantageously, said trivalent oxide is present at a molar concentration constituted by a first portion enabling the zirconia to be stabilized partially, and a second portion which introduces point defects into the lattice, and said pentavalent oxide is present at a molar concentration equal to the molar concentration of said second portion of the trivalent oxide.

In the method of the invention, said trivalent oxide is selected from the group comprising: yttrium oxide, scandium oxide, dysprosium oxide, ytterbium oxide, erbium oxide, gadolinium oxide, europium oxide, samarium oxide, neodymium oxide, praseodymium oxide, lanthanum oxide, terbium oxide, holmium oxide, and mixtures thereof.

Likewise, said pentavalent oxide is selected from the group comprising niobium oxide, tantalum oxide, and mixtures thereof.

Advantageously, said trivalent oxide is present at a molar concentration lying in the range 4% to 30% and said pentavalent oxide is present in a molar concentration lying in the range 2% to 20%, preferably in the range 4% to 12%, and more preferably in the range 3% to 10%.

The method is preferably implemented with a difference between the molar concentration of trivalent oxide and the molar concentration of pentavalent oxide lying in the range 4% to 12%, and preferably substantially equal to 4%.

In an alternative implementation of the method of fabrication of the invention, the method includes an additional step consisting in oxidizing the bonding underlayer prior to depositing the ceramic coating.

What is claimed is:

1. A thermal barrier composition of low thermal conductivity and of high high-temperature strength, made of ceramic, the composition comprising a zirconia base, at least one trivalent oxide enabling the zirconia to be stabilized, and enabling the thermal conductivity of the zirconia to be reduced in optimum manner, and at least one pentavalent oxide enabling the content of oxygen vacancies to be reduced so as to make it substantially equal to that of the partially stabilized zirconia, said trivalent oxide being selected from the group consisting of: erbium oxide, europium oxide, praseodymium oxide, terbium oxide, holmium oxide, and mixtures thereof.

2. A thermal barrier composition according to claim 1, wherein said trivalent oxide is present at a molar concentration constituted by a first portion enabling the zirconia to be stabilized partially, and by a second portion which introduces point defects into the lattice, and wherein said pentavalent oxide is present at a molar concentration equal to said molar concentration of said second portion of the trivalent oxide.

3. A thermal barrier composition according to claim 1, wherein said pentavalent oxide is selected from the group consisting of niobium oxide, tantalum oxide, and mixtures thereof.

4. A thermal barrier composition according to claim 1, wherein said trivalent oxide is present at a molar concentration lying in the range 4% to 30%.

5. A thermal barrier composition according to claim 1, wherein said pentavalent oxide is present at a molar concentration lying in the range 2% to 20%.

6. A thermal barrier composition according to claim 1, wherein the difference between the molar concentration of the trivalent oxide and the molar concentration of the pentavalent oxide lies in the range 4% to 12%.

7. A superalloy machine part including a ceramic coating having a composition according to claim 1.

8. A superalloy machine part according to claim 7, further including a bonding underlayer on which said ceramic coating is deposited.

9. A superalloy machine part according to claim 8, wherein said bonding underlayer is constituted by an alloy suitable for forming a protective alumina layer by oxidation.

10. A superalloy machine part according to claim 9, wherein said bonding underlayer is constituted by an alloy of the MCrAlY type, where M is a metal selected from nickel, cobalt, iron, or a mixture of said metals.

11. A superalloy machine part according to claim 9, wherein said bonding underlayer is constituted by a nickel aluminide optionally containing a metal selected from platinum, chromium, palladium, ruthenium, iridium, osmion, rhodium, or a mixture of these metals, and/or a reactive element selected from zirconium, hafnium, and yttrium.

12. A superalloy machine part according to claim 8, said ceramic coating further comprising, on said underlayer, a ceramic layer based on yttrium-containing zirconia, having a molar content of yttrium oxide lying in the range 4% to 12%.

13. A ceramic coating comprising a bonding underlayer, a first ceramic layer based on yttrium-containing zirconia having a molar content of yttrium oxide lying in the range 4% to 12%, and a second ceramic layer presenting a composition according to claim 1, said first ceramic layer being situated between said bonding underlayer and said second ceramic layer.

14. A thermal barrier composition according to claim 1, wherein said pentavalent oxide is present at a molar concentration lying in the range of 4% to 12%.

15. A thermal barrier composition according to claim 1, wherein said pentavalent oxide is present at a molar concentration lying in the range of 3% to 10%.

16. A thermal barrier composition according to claim 1, wherein the difference between the molar concentration of the trivalent oxide is substantially equal to 4%.

* * * * *